(12) United States Patent
Noon et al.

(10) Patent No.: US 7,982,446 B2
(45) Date of Patent: Jul. 19, 2011

(54) POWER SUPPLY CIRCUIT WITH DYNAMIC CONTROL OF A DRIVER CIRCUIT VOLTAGE RAIL

(75) Inventors: James Noon, Merrimack, NH (US); Lawrence Spaziani, Chelmsford, MA (US); Robert T. Carroll, Andover, MA (US); Venkat Sreenivas, Winchester, MA (US)

(73) Assignee: International Rectifier Corporation, El Segundo, CA (US)

( * ) Notice: Subject to any disclaimer, the term of this patent is extended or adjusted under 35 U.S.C. 154(b) by 504 days.

(21) Appl. No.: 12/143,048

(22) Filed: Jun. 20, 2008

(65) Prior Publication Data

US 2009/0195231 A1  Aug. 6, 2009

Related U.S. Application Data

(60) Provisional application No. 61/025,525, filed on Feb. 1, 2008.

(51) Int. Cl.
*G05F 1/56* (2006.01)
(52) U.S. Cl. .................. 323/285; 323/272; 323/299
(58) Field of Classification Search .............. 323/272, 323/282, 285, 299
See application file for complete search history.

(56) References Cited

U.S. PATENT DOCUMENTS

| | | | | |
|---|---|---|---|---|
| 5,359,278 A * | 10/1994 | Notohara et al. | ............ | 323/222 |
| 6,150,803 A * | 11/2000 | Varga | ............ | 323/282 |
| 6,268,716 B1 * | 7/2001 | Burstein et al. | ............ | 323/272 |
| 6,346,798 B1 * | 2/2002 | Passoni et al. | ............ | 323/272 |
| 6,580,258 B2 * | 6/2003 | Wilcox et al. | ............ | 323/282 |
| 7,141,940 B2 * | 11/2006 | Ortiz | ............ | 315/291 |
| 7,394,233 B1 * | 7/2008 | Trayling et al. | ............ | 323/272 |
| 7,482,796 B2 * | 1/2009 | Nishida | ............ | 323/284 |
| 7,772,811 B1 * | 8/2010 | Jain et al. | ............ | 323/224 |

* cited by examiner

*Primary Examiner* — Jeffrey L Sterrett
(74) *Attorney, Agent, or Firm* — Chapin IP Law, LLC

(57) ABSTRACT

According to one configuration, a monitor circuit monitors a delivery of power supplied by one or more switch devices to a dynamic load. Based on an amount of power delivered to the load as measured by the monitor circuit, a control circuit produces a voltage control signal. A gate bias voltage generator circuit utilizes the voltage control signal to generate a switch activation voltage or bias voltage. A switch drive circuit uses the switch activation voltage as generated by the bias voltage generator to activate each of the one or more switch devices during a portion of a switching cycle when a respective switch device is in an ON state, and the respective switch device conducts current from a voltage source through the switch device to the load. The control circuit adjusts the voltage control signal to modify a level of the switch activation voltage depending on the dynamic load.

30 Claims, 13 Drawing Sheets

POWER SUPPLY CIRCUIT WITH DYNAMIC CONTROL OF A DRIVER CIRCUIT VOLTAGE RAIL

RELATED APPLICATIONS

This application is related to and claims the benefit of earlier filed U.S. Provisional Patent Application Ser. No. 61/025,525 filed on Feb. 1, 2008, and entitled "LOAD ADAPTIVE GATE DRIVE BIAS SUPPLY," the entire teachings of which are incorporated herein by this reference.

BACKGROUND

It is known that a conventional voltage regulator (VR) can be used to regulate a DC voltage supplied to a load such as a microprocessor. A VR can include a power converter, such as a DC-DC converter, and may include other components such as a controller for controlling operation of the power converter.

An example of a DC-DC converter is a synchronous buck converter, which has minimal components, and therefore is widely used in VR applications. In an example application, the input voltage to the buck converter is typically $12V_{DC}$. An output voltage produced by the VR may be $5.0V_{DC}$, $3.3V_{DC}$, or even lower.

Conventional multiphase interleaved VR power supply topologies can include two or more power converter phases that operate in parallel with each other to convert power and supply power to a corresponding load. Implementation of a multiphase voltage converter topology (as compared to a single voltage converter phase topology) can therefore enhance the output current capability of a power supply system.

A typical configuration of a VR such as a so-called synchronous buck converter includes an inductor, a high side switch, and a low side switch. A controller associated with the buck converter repeatedly pulses the high side switch ON to convey power from a power source through the inductor to a dynamic load. The controller repeatedly pulses the low side switch ON to provide a low impedance path from a node of the inductor to ground in order to control an output of the buck converter. Thus, the energy stored in the inductor increases during a time when the high side switch is ON and decreases during a time when the low side switch is ON. During switching operation, the inductor transfers energy from the input to the output of the converter.

Today's microprocessors and high performance ASIC chips can operate on low voltages and require a wide range of currents such as less than 1 Ampere and over 100 amperes. A load can operate at these extremes of current for long periods of time.

SUMMARY

Conventional voltage converter circuits as discussed above suffer from a number of deficiencies. For example, power supply circuits such as conventional synchronous buck converters internally dissipate a portion of energy received from a respective power source in lieu of conveying all of the energy received from a respective power source to a corresponding load. This wasted energy precipitates out of the buck converter circuit as unwanted heat, which (if too high) can increase the likelihood of damage to the buck converter or other nearby electronic components. Losses (e.g., dissipation of unwanted heat) associated with the buck converter increase an amount of power that must be provided to the input of the buck converter. Inefficiencies in the buck converter can require that the power supply be oversized to account for losses in the buck converter.

One type of undesirable energy loss in a switching power supply circuit such as a buck converter or other type of switching circuit includes losses associated with driving the gates of respective high and low side switches. In other words, a certain amount of energy is lost merely by driving the gates of respective switch devices to ON and OFF states. As discussed above, switching action of a buck converter is needed to maintain an output voltage within an operating range. Because the gate of a respective field effect transistor switch is capacitive by nature, the charging and discharging of the gates of the high and low side power switches results in power losses. These losses can be quite substantial for power supplies that operate at higher switching frequencies. Also, such switching losses can be more substantial when a power supply includes multiple phases because more switches must be turned on and off.

Techniques discussed herein deviate with respect to conventional applications such as those discussed above. For example, certain embodiments herein are directed to improving the efficiency of switching power supply circuits and switching circuits in general.

More specifically, according to one configuration, a monitor circuit monitors delivery of power supplied to a dynamic load. Based on a power supply parameter such as an amount of power delivered to the load as measured by the monitor circuit, a control circuit produces a voltage control signal. A bias voltage generator circuit utilizes the voltage control signal as received from the monitor circuit to generate a switch activation voltage. A switch drive circuit uses the switch activation voltage as generated by the bias voltage generator to activate one or more switch devices. For example, the switch drive circuit uses the switch activation voltage to activate a respective switch device during a portion of a switching cycle when the respective switch device is in an ON state. When in the ON state, the respective switch device conducts current from a voltage source through the switch device to the load. During cyclic operation of turning respective switches ON and OFF, the control circuit adjusts the voltage control signal to modify a level of the switch activation voltage depending on an amount of power supplied to the dynamic load. Thus, a switch activation voltage such as that used to drive one or more gates of a field effect transistor can be varied depending on a state of the dynamic load.

In furtherance of such embodiments, during conditions when the load consumes a relatively small amount of power, the switch activation voltage can be a relatively low value. Conversely, during conditions when the load consumes a relatively large amount of power, the switch activation voltage can be a relatively higher voltage value.

Thus, embodiments herein include monitoring a delivery of power supplied to a dynamic load; producing a voltage control signal that is used to generate a switch activation voltage, the switch activation voltage used to activate one or more switch devices for delivery of the power through the switch devices to the dynamic load; and adjusting the control signal to modify a level of the switch activation voltage depending on a power supply parameter such as an amount of power supplied to the dynamic load.

Another embodiment herein includes producing a voltage rail; utilizing the voltage rail to activate a switch device for delivery of power through the switch device to a dynamic load; and varying a magnitude or amplitude of the voltage rail depending on a parameter such as an amount of power supplied to the dynamic load.

Yet another embodiment herein includes repeatedly switching a field effect transistor from an ON state to an OFF state to supply power through the field effect transistor to a dynamic load; monitoring the power supplied to the dynamic load; and adjusting a level of a gate voltage applied to the field effect transistor to activate the field effect transistor to the ON state, the adjusted level of the gate voltage varying depending on the power supplied by the field effect transistor to the dynamic load.

Embodiments herein are useful over the prior art because modifying a switch activation voltage based on current operating conditions increases an efficiency of a corresponding power supply circuit. For example, as previously discussed, the amount of power losses resulting from switching the gates ON and OFF can be substantial. Dynamically changing a switch activation voltage level over a range of power supply conditions can reduce these losses because higher switch activation voltage levels are applied during conditions such as when a phase supplies a relatively large amount of power to a load. Conversely, lower switch activation voltage levels are applied during conditions such as when a phase supplies a relatively low amount of power to a load. In other words, at low power conditions, lowering a level of the switch activation voltage saves power at lower currents even though the $R_{DS}$ of the field effect transistor increases when the gate-to-source voltage is reduced.

Although techniques herein are well suited for use in switching power supply circuit, it should be noted that embodiments herein are not limited to use in such applications and that the techniques discussed herein are well suited for other applications as well.

Note also that each of the different features, techniques, configurations, etc. discussed herein can be executed independently or in combination with any or all other features also described herein. Accordingly, the present invention can be embodied, viewed, and claimed in many different ways.

This summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives or permutations of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
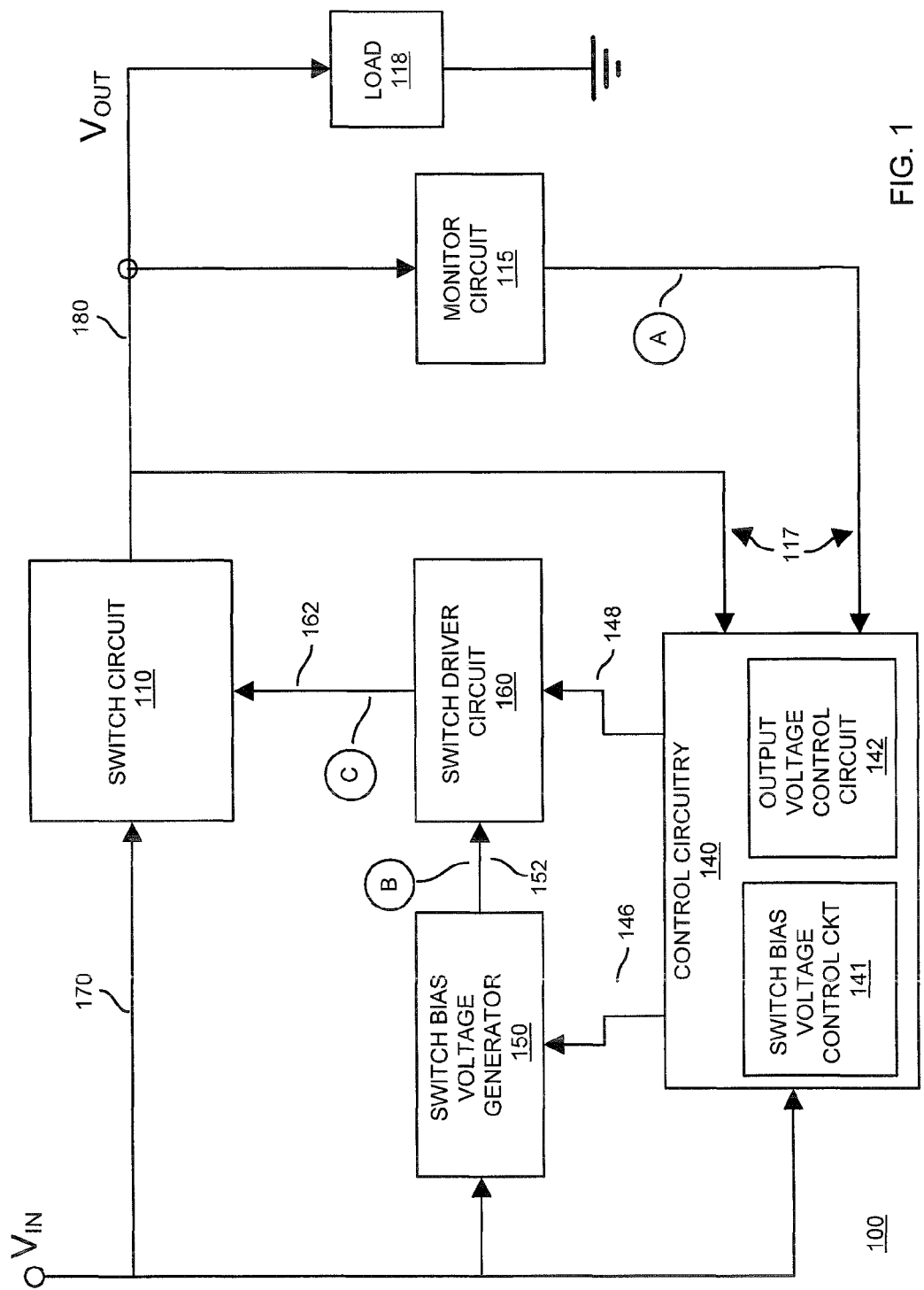
FIG. 1 is an example diagram of a power supply system according to embodiments herein.

FIG. 1 is a diagram of an example power supply system 100 according to embodiments herein. As shown, power supply system 100 includes switch circuit 110, switch bias voltage generator 150, switch driver circuit 160, monitor circuit 115, control circuit 140, and load 118. Control circuit 140 includes output voltage control circuit 142 and switch bias voltage control circuit 141.

In one embodiment, a combination of the resources in power supply system 100 produces a substantially constant output voltage 180 for driving dynamic load 118. By way of a non-limiting example, the output voltage can be a DC voltage of 1.5±0.05 VDC.

During operation, monitor circuit 115 monitors one or more operating parameters of power supply 100. Assume in this example that the monitor circuit monitors an amount of power such as current provided by switch circuit 110 to load 118. Note that the monitor circuit 115 can be configured to monitor other parameters such as the power consumed by load 118, operating parameter of switches such as switch duty cycles, etc. to identify a relative amount of power provided by switch circuit 110 or consumed by load 118.

Load 118 can be a microprocessor that consumes different amounts of power over time depending on its current power needs. Current requirements can quickly change from as low as less than several amps to over one hundred or more amps. Based on monitoring of these and/or other parameters associated with the power supply 100, the monitor circuit 115 produces and forwards power supply input parameters 117 to control circuit 140.

As previously discussed, control circuit 140 includes output voltage control circuit 142 and switch bias voltage control circuit 141. By way of a non-limiting example, the output voltage control circuit 142 can be configured as a feedback type of circuit while the switch bias voltage control circuit 141 can be configured as a feed forward circuit.

Implementation of the switch bias voltage control circuit 141 as a feed forward signal eliminates the feedback error amplifier and associated compensation components for low cost. However, note again that implementation as a feed forward signal is by way of example only and that alternative embodiments as described herein can include generation of switch bias voltage 152 based on feedback.

As shown, the output voltage control circuit 142 can be configured to produce switch control signal(s) 148. The switch control signal(s) 148 control switching operation of one or more switch devices in switch circuit 110. As will be discussed later in this specification, activation of the switches in switch circuit 110 results in conveyance of power from input voltage 170 to output voltage 180.

During operation, when the output voltage 180 instantaneously decreases as a result of increased power consumption by load 118, the output voltage control circuit 142 detects such a condition and produces switch control signal(s) 148 indicating to switch circuit 110 to increase conveyance of power from input voltage 170 to output voltage 180. Conversely, when the output voltage 180 increases as a result of detecting a reduced power consumption rate by load 118, the output voltage control circuit 142 produces switch control signal(s) 148 indicating to decrease a rate of conveying power from input voltage 170 to output voltage 180. Thus, based on feedback, the output voltage control circuit 142 can maintain the output voltage 180 within a predetermined voltage range.

In one embodiment, the output voltage control circuit 142 initiates opening and closing of appropriate switches in switch circuit 110 such that output voltage 180 is maintained within a specified range such as 1.5±/−0.05 VDC. An example of multiple parallel power converter phases and corresponding high side switches and low side switches in switch circuit 110 will be discussed in more detail with respect to other figures such as FIG. 5.

Before continuing the discussion with other figures, note that the control circuit 140 in FIG. 1 also includes a switch bias voltage control circuit 141. In general, the switch bias voltage control circuit 141 produces bias voltage control signal(s) 146. As its name suggests, the bias voltage control signal(s) 146 indicate or control a respective level of the switch bias voltage 146 as produced by switch bias voltage generator 150.

For example, in one embodiment, the switch bias voltage generator 150 receives the bias voltage control signal(s) 146 and, based on a respective bias voltage level as specified by the bias voltage control signal(s) 146, the switch bias voltage generator 150 generates the bias voltage 152.

In one embodiment, the switch bias voltage 152 is a voltage rail used by switch driver circuit 160 to control operation of one or more switches in switch circuit 110.

The switch bias voltage control circuit 141 can specify generation of or control generation of different bias voltage levels depending on a current state and/or passed history of the input parameters 117.

As previously discussed, by way of non-limiting example, the input parameters 117 can include a measure of a parameter such as current or power supplied by switch circuit 110 to load 118 as previously discussed. The bias voltage control signal(s) 146 produced by switch bias voltage control circuit 141 vary depending on the power or current supplied to load 180. Thus, a switch activation voltage level such as switch bias voltage 152 that is used to drive one or more gates of a field effect transistor in the switch circuit 110 can be varied depending on a state of the dynamic load 118.

In furtherance of such embodiments, during conditions when the load 118 consumes relatively low power or requires relatively low current to sustain the output voltage 180 at a substantially constant value, the switch bias voltage control circuit 141 can be configured to initiate setting the switch bias voltage 152 to a relatively low voltage or minimum gate voltage level. Conversely, during conditions when the load 118 consumes relatively high power or requires relatively high current to sustain the output voltage 180 at a substantially constant value, the switch bias voltage control circuit 141 initiates generation of the switch bias voltage 152 to a relatively high gate voltage level.

Thus, embodiments herein include a monitor circuit 115 to monitor a delivery of power supplied to a dynamic load 118.

The switch bias voltage control circuit 141 produces, depending on input parameters 117, bias voltage control signal(s) 146 that are used to generate a switch activation voltage such as switch bias voltage 152.

As will be discussed in more detail later in this specification, the switch activation voltage (e.g., switch bias voltage 152) can be a voltage rail used by the switch driver circuit 160 to activate/deactivate one or more switch devices in switch circuit 110 for delivery of the power or current through the switch circuit 110 to the dynamic load 118. The switch bias voltage control circuit 141 adjusts the bias voltage control signal 146 to modify a level of the switch activation voltage (e.g., switch bias voltage 152) depending on an amount of power or current supplied to the dynamic load 118.

Modifying the switch bias voltage 152 based on power supply operating conditions such as input parameter 117 and varying a respective switch activation voltage level increases an efficiency of a corresponding power supply 100. For example, as previously discussed, the amount of power losses resulting from switching one or more gates of switch circuit 110 ON and OFF can be substantial. As will be discussed later in this specification, dynamically changing a switch activation voltage level such as switch bias voltage 152 over a range of power supply conditions can reduce these losses because higher switch activation voltage levels can be applied during conditions such as when a switching circuit in power supply 100 supplies a relatively large amount of power to a load. Conversely, lower switch activation voltage levels can be applied during conditions such as when a switching circuit in power supply 100 supplies a relatively low amount of power to a load.

Conventional power supply applications select a fixed bias voltage value that never changes over a range of different loads and output currents. Contrary to these conventional power supply applications, embodiments herein include reducing a gate-to-source voltage to increase power efficiency associated with the power supply system 100.

Figure 2:
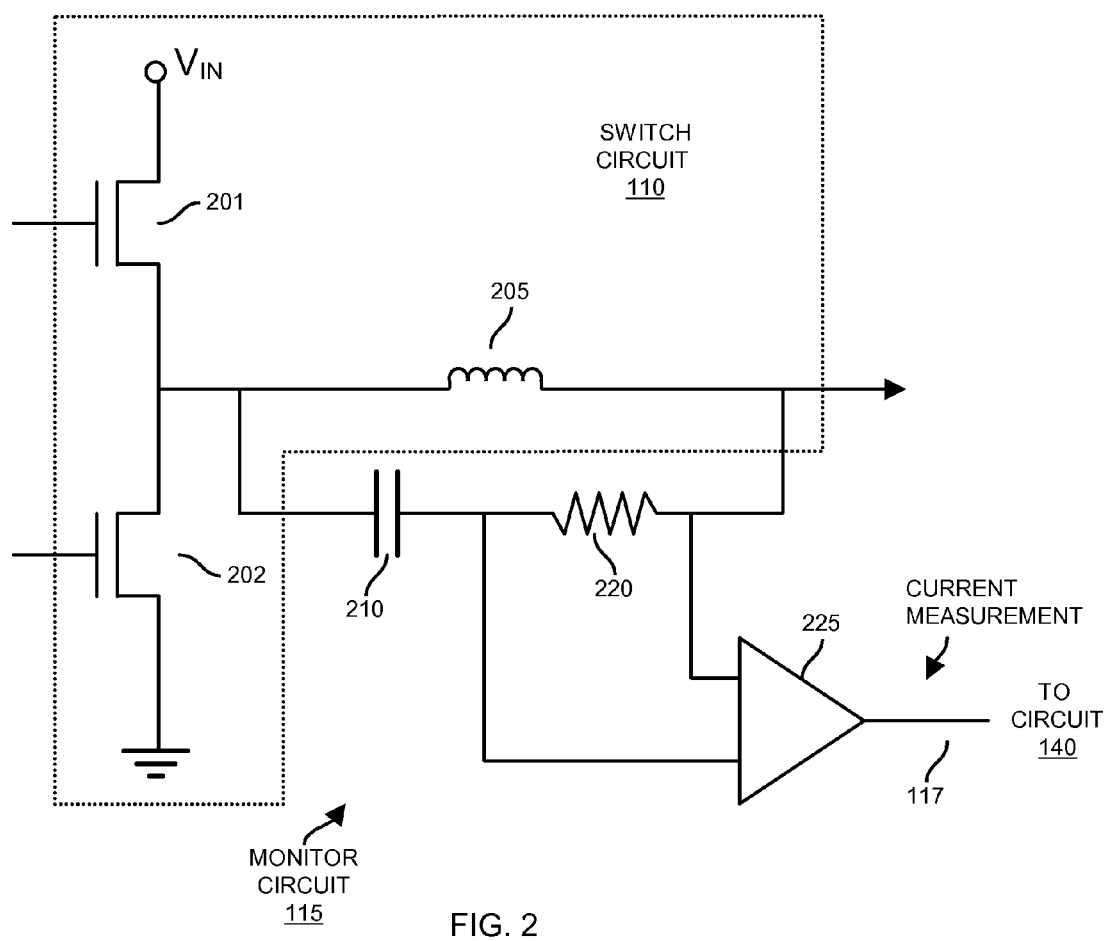
FIG. 2 is an example diagram illustrating a monitor circuit according to embodiments herein.

FIG. 2 is an example diagram illustrating an example monitor circuit 115 to measure current in each of one or more power converter phases present in switch circuit 110. As shown, a combination of high side switch 201, low side switch 202, and inductor 205 forms a switching phase in switch circuit 110.

The inductor 205 acts as an energy storage device.

The example monitor circuit 115 includes a serially connected capacitor 210 and resistor 220 disposed in parallel with inductor 205. Inputs of integrator circuit 225 are connected across resistor 220. Monitoring the voltage across resistor 220 produces an output voltage whose output is proportional to the amount of current supplied by the respective phase to load 118. Thus, by way of a non-limiting example, monitor circuit 115 is able to monitor an amount current provided by a respective power converter phase in switch circuit 110.

In a similar manner, the monitor circuit 115 can be configured to measure current for each of multiple phases in switch circuit 110. As previously discussed, the monitor circuit 115 forwards the current measurement information as input parameters 117 to control circuit 140. In such an embodiment, the monitor circuit 115 in power supply 100 is configured to detect an amount of current delivered by each of multiple phases in a switch circuit 110. A combination of the current delivered by each of the multiple phases can deliver enough power to the dynamic load to maintain a voltage of the dynamic load at a substantially fixed voltage value.

Figure 3:
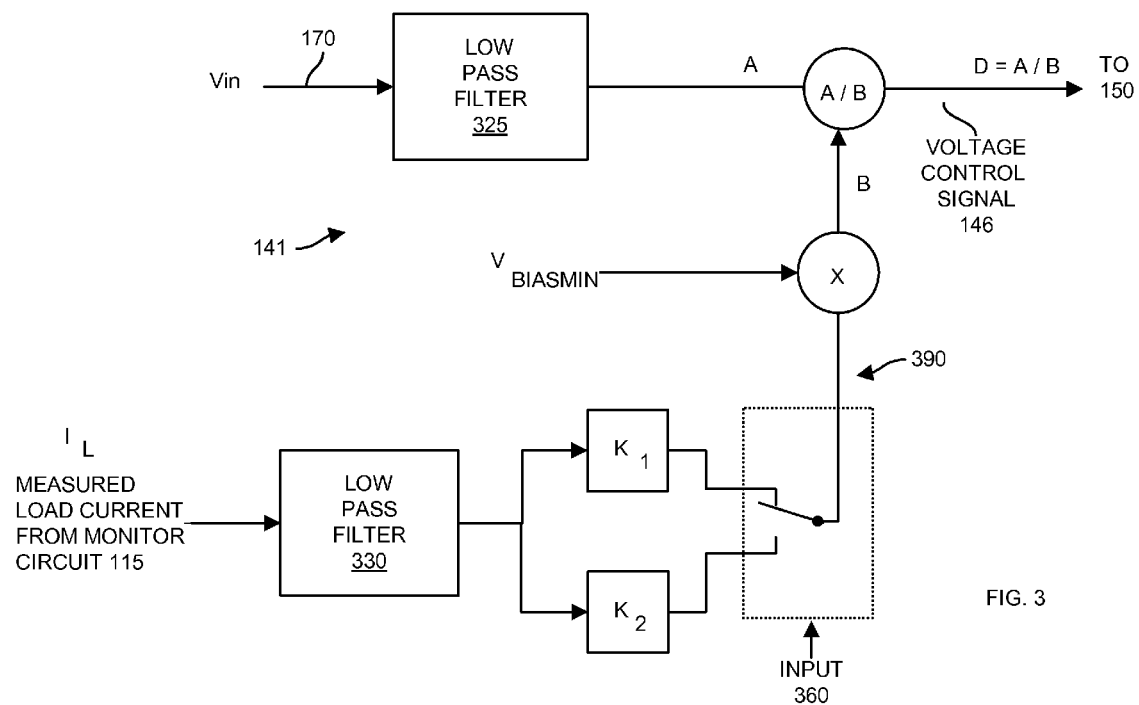
FIG. 3 is an example diagram of an algorithm to generate a voltage control signal according to embodiments herein.

FIG. 3 is an example diagram illustrating generation of one or more bias voltage control signal(s) 146 according to embodiments herein. The control logic of switch bias voltage control circuit 141 can be implemented as a hardware circuit, software instructions executed by a processor, or a combination of both hardware and software.

Figure 4:
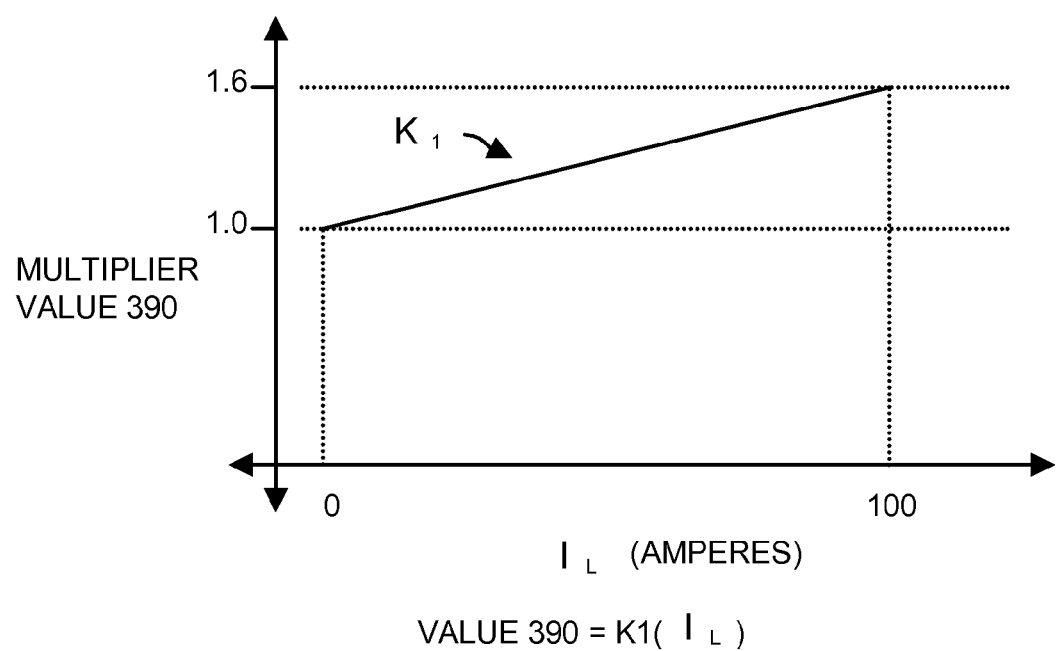
FIG. 4 is an example diagram of an function for producing an multiplier value according to embodiments herein.

In the present example, assume that the switch bias voltage generator 150 is implemented as a buck converter as shown in FIG. 4. In such an embodiment, the switch bias voltage 152 varies as a function of a switch pulse width modulation duty cycle (D) of the bias voltage control signal(s) 146. The DC conversion ratio for the example converter is $V_{BIAS}/Vin=D$.

During operation, the switch bias voltage control circuit 141 in FIG. 3 can generate bias voltage control signal 146 (e.g., D) based on a combination of parameters 117 such as input voltage 170, the minimum bias voltage $V_{BIASMIN}$, and measured load information from monitor circuit 115.

More specifically, according to one embodiment, the total load current for all active phases in the switch circuit 110 is summed by switch bias voltage controller 141 and passed through filter 330. Low pass filter 330 can be used to set the time constant of the variation in D caused by the change in output current. Filter 330 can be programmable to allow optimization of the reaction time of the load adaptive response.

In this example embodiment, the summed value or load current, $I_L$, is multiplied by function K1 or function K2 depending on how many phases in the switch circuit 110 are active to generate the desired slope of the drive voltage versus the load current. In other words, if only one phase is active as indicated by input 360, then switch bias voltage control circuit 141 uses function K2 for producing a multiplier value 390 between 1.0 and 1.6. If each of multiple phases in switch circuit 110 are active as indicated by input 360, the selection logic 360 selects function K1 for producing a multiplier value 390 between 1.0 and 1.6.

FIG. 4 is an example graph illustrating a function for generating a multiplier value 390 according to embodiments herein. In general, the function K1 produces a multiplier value 390 between 1.0 and 1.6 depending on the measured load current $I_L$.

Figure 5:
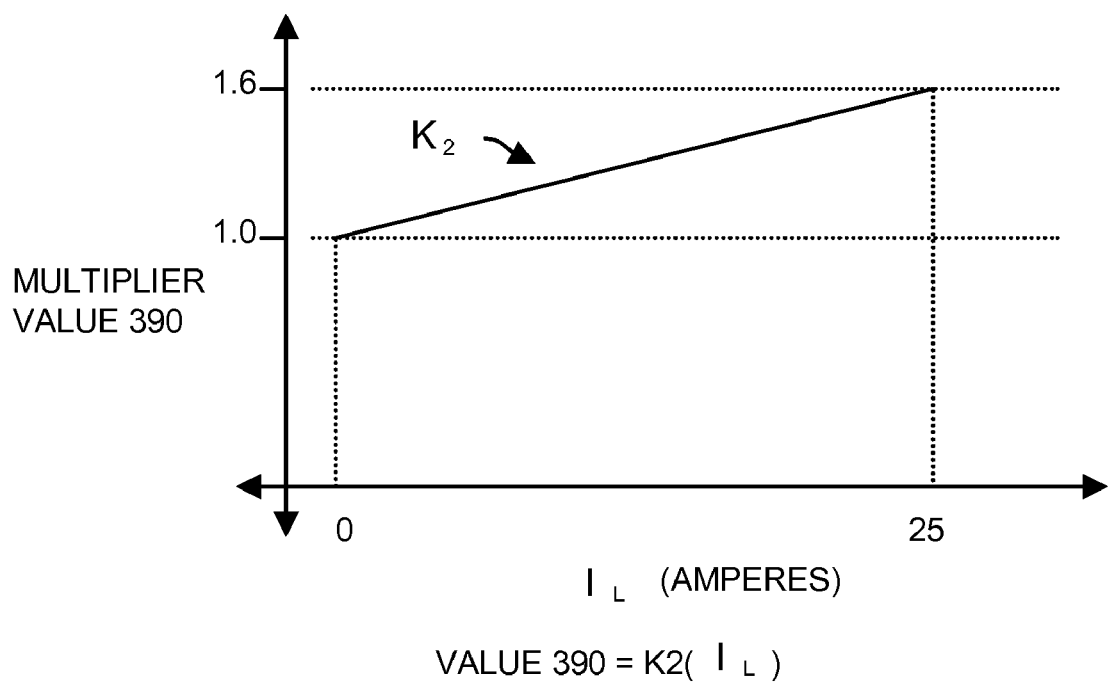
FIG. 5 is an example diagrams of an function for producing an multiplier value according to embodiments herein.

FIG. 5 is an example graph illustrating a function for generating a multiplier value 390 according to embodiments herein. In general, the function K1 produces a multiplier value 390 between 1.0 and 1.6 depending on the measured load current $I_L$.

Referring again to FIG. 3, in certain voltage regulators for microprocessor applications, there is a so-called power state indicator signal (PSI) that is asserted when the processor is in a low power mode. The PSI signal can be used to drive input 360. The PSI signal changes based on a mode of the switch circuit 110 between single phase operation and multi-phase operation. In a low power mode as indicated by PSI signal, the load 118 is powered by a single phase in switch circuit 110 and the multiplier value 390 is generated based on use of function K2 that optimizes gate drive voltage for single phase operation, low current mode. In a high power mode as indicated by PSI, the load is powered by a multiple phases and the multiplier value 390 is generated based on use of function K1 that optimizes gate drive voltage for multiphase operation.

In the example embodiment shown, the bias voltage control signal(s) 146 is a pulse width modulated signal having a duty cycle, $D=(V_{BIASMIN}\cdot K(I_L))/V_{IN}$. As discussed above, the value of $K(I_L)$ varies depending on measured load current. Note that the low pass filter 325 can reduce any instantaneous variations in duty cycle resulting from noise on the input voltage 170. In general, the value $(V_{BIASMIN}\cdot K(I_L))$ represents the voltage to be produced by switch bias voltage generator 150.

In other embodiments, note that the functions $K_1$ and $K_2$ can be combined into a single function K so that there is no need to switch between use of two different functions to determine $K(I_L)$. In such an embodiment, the input $I_L$ to low pass filter 330 is an average current provided by a number of active phases in switch circuit 110 supplying current to load 118.

Note also that functions such as $K_1$, $K_2$, etc. have been shown by way of example only and the functions need not be linear. Instead, they can be non-linear functions, piece-meal functions, etc. Thus, derivation of the multiplier value 390 can be done in a number of different ways.

In yet further embodiments, the functions can be implemented as one or more look-up tables in which the measured load current information is converted into a corresponding value between 1.0 and 1.6 depending on a magnitude of the load current or other measured parameter of switch circuit 110.

Figure 6:
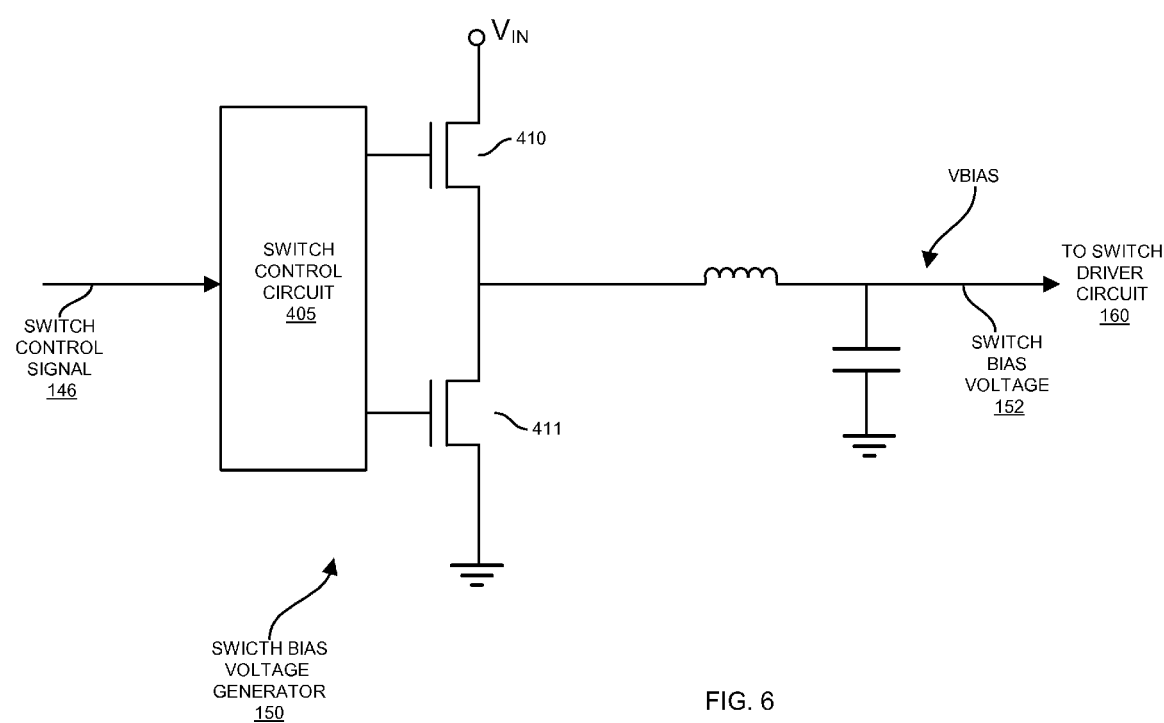
FIG. 6 is an example diagram illustrating a circuit for generating a switch bias voltage according to embodiments herein.

FIG. 6 is an example diagram illustrating an example switch bias voltage generator 150 according to embodiments herein. By way of a non-limiting example, the switch bias voltage generator 150 can be a synchronous buck converter that in turn generates the switch bias voltage 152 to activate one or more switch devices in switch circuit 110.

The bias voltage control signal(s) 146 control activation of high side switch 410 and low side switch 411 such as field effect transistors in switch bias voltage generator 150.

Bias voltage control signal(s) 146 can be one or more digital pulse width modulation signal as produced by switch bias voltage control circuit 141 as discussed above.

In the context of the present example, when the signal 146 is low, switch control circuit 405 produces a control signal to activate (e.g., turn ON) low side switch 411 and deactivate (e.g., turn OFF) high side switch 410. Conversely, when the signal 146 is high, switch control circuit 405 produces a control signal to deactivate low side switch 411 and activate high side switch 410.

Assume that $V_{BIASMIN}$ is 5.0 volts in this example. Based on switching of high side switch 411 and low side switch 410, the switch bias voltage generator 150 produces a switch bias voltage 152 that varies between a minimum and maximum voltage such as between 5.0 volts DC and 8.0 volts DC. In accordance with the discussion above, the switch bias voltage generator 150 generates lower values around 5.0 volts DC when the switch circuit 110 supplies minimal current to the load 118 as determined by function K as previously discussed. The switch bias voltage generator 150 generates higher values around 8.0 volts DC when the switch circuit 110 supplies maximum current to the load 118 as determined by function K as previously discussed.

Note that implementing the switch bias voltage generator 150 in FIG. 4 as a buck converter is shown is shown by way of non-limiting example only and that any type of voltage generator can be used to generate switch bias voltage 152. Of course, generation of bias voltage control signal(s) 146 may change depending on a type of voltage generator used to produce switch bias voltage 152. Also, the logic associated with switch bias voltage control circuit 141 in FIG. 3 is also shown by way of non-limiting example only and can vary depending on the application.

In one embodiment, the control circuit 140 includes soft-start capability to prevent transient over-voltages from occurring on the switch bias voltage 152. For example, on start up of the power supply 100 such as during a first millisecond of operation, the bias voltage control signal(s) 146 or duty cycle, D, as produced by switch bias voltage control circuit 141 can be ramped up from a 0% duty cycle to the appropriate duty cycle values as discussed above to produce a variable switch bias voltage 152 depending on load conditions. Thus, embodiments herein include modifying the bias voltage control signal 146 to reduce transient over-voltages on the switch bias voltage 152 during startup when a switch device such as high side switch 410 and low side switch are initially activated to produce switch bias voltage 152.

Figure 7:
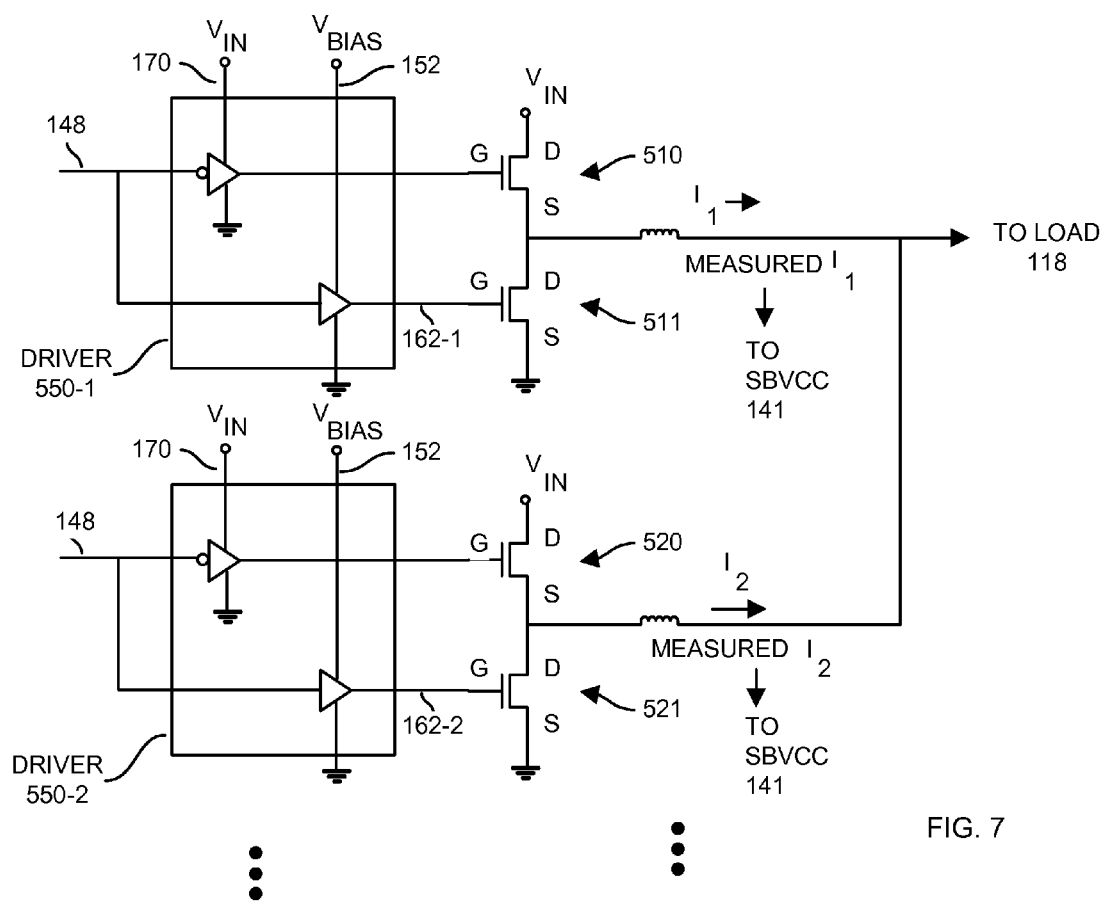
FIG. 7 is an example diagram illustrating details of a switch drive circuit and switches according to embodiments herein.

FIG. 7 is an example diagram illustrating use of a switch bias voltage 152 and switch control signal(s) 148 to control a switch circuit 110 according to embodiments herein. As shown, example switch circuit 110 includes multiple power converter phases, each of which has a corresponding high side switch and low side switch to supply current to load 118.

Switch driver circuit 160 includes driver 550-1 and driver 550-2 (collectively, drivers 550). During operation, driver 550-1 drives respective gates of high side switch 510 and low side switch 511 of a respective power converter phase in switch circuit 110. Driver 550-2 drives respective gates of high side switch 520 and low side switch 521 of a respective power converter phase in switch circuit 110. The inductors act as energy storage devices.

In addition to receiving switch activation signals 162, drivers 550 receive switch bias voltage 152 produced by switch bias voltage generator 150 as previously discussed. When activating and deactivating respective low side switch 511 and low side switch 521, the drivers 550 switch between applying a ground and the switch bias voltage 152 to the respective gates. As previously discussed, a value of the switch bias voltage 152 can vary depending on the current delivered to load 118.

Varying the switch bias voltage 152 as described herein can increase efficiency of power supply 100. Note that that the control circuit 140 can be configured to increase efficiency of the power supply 100 even further. For example, the control circuit 140 can be configured to shed phases of switch circuit 110 as the current required by the dynamic load 118 decreases below a threshold value. Operating fewer power converter phases enables each of the activated phases to operate at higher efficiency.

Also, note that the frequency of the switch activation signals 162 can be reduced so that there are less losses during the switching of the respective field effect transistors between ON and OFF states.

Figure 8:
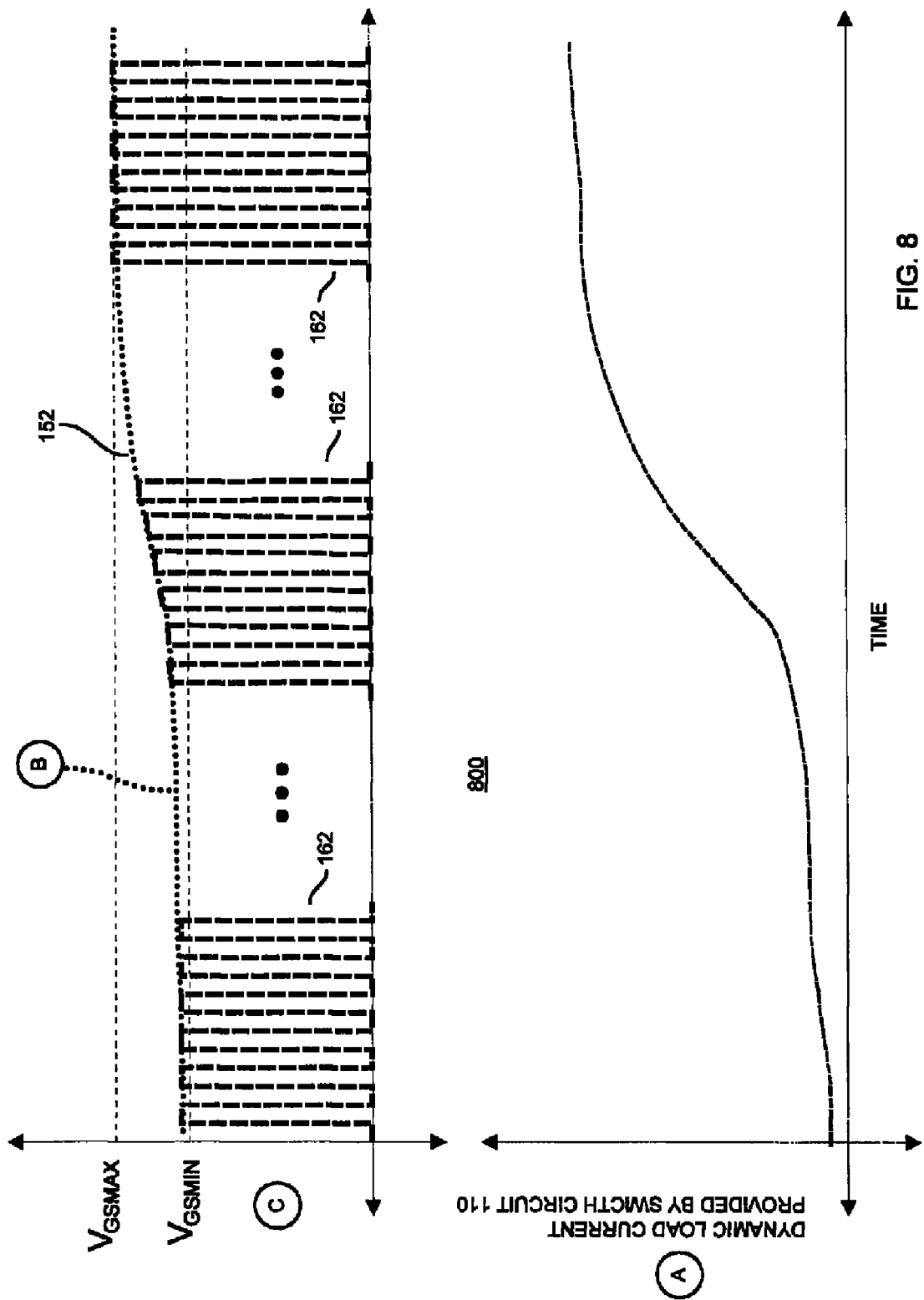
FIG. 8 is an example graph illustrating modification of a switch activation voltage level depending on changes in dynamic load current according to example embodiments herein.

FIG. 8 is an example graph 600 illustrating cyclical or sequential application of the switch bias voltage 152 to respective gates of low side switch 511 and low side switch 521 according to embodiments herein. As shown, the load current, $I_L$, produced by switch circuit 110 changes over time. Depending on a value of the load current, the switch bias voltage control circuit 141 generates bias voltage control signal(s) 146 to vary the switch bias voltage 152 produced by switch bias voltage generator 150 depending on load current.

As previously discussed, a magnitude or amplitude of the switch drive signal(s) 162 applied to respective gates of field effect transistors in the switch circuit 110 such as low side switches 511 and 521 thus varies depending on a parameter such as load current. For example, as shown, for higher load currents, the drivers 550 drive respective gates of low side switches in switch circuit 110 with higher ON gate voltages nearer a value such as $V_{GSMAX}$. Conversely, for lower load currents, the drivers 550 drive respective gates of low side switches in switch circuit 110 with lower ON gate voltages nearer a value such as $V_{GSMIN}$.

Thus, embodiments herein include a control circuit 140 configured to: i) control the switch activation voltage to be a lower ON gate voltage value in the range when the power supplied to the dynamic load is low, and ii) control the switch activation voltage to be a higher lower ON gate voltage value in the range when the power supplied to the dynamic load is high.

As described herein, the control circuit 140 can be configured to adjust the bias voltage control signal(s) 146 to modify the level of the switch bias voltage 152. In an example embodiment, the control circuit 140 controls the switch bias voltage 152 in a range between a minimum ON gate voltage value and a maximum ON gate voltage value depending on a magnitude or amplitude of the power supplied to the dynamic load.

Note that the duty cycle of switch activation signals 162 can vary depending on an amount of current being consumed by dynamic load 118. As previously discussed, control of the duty cycle of switches in switch circuit 110 can be based on a feedback loop so that the control circuit 140 maintains the output voltage 180 within an acceptable range.

Figure 9:
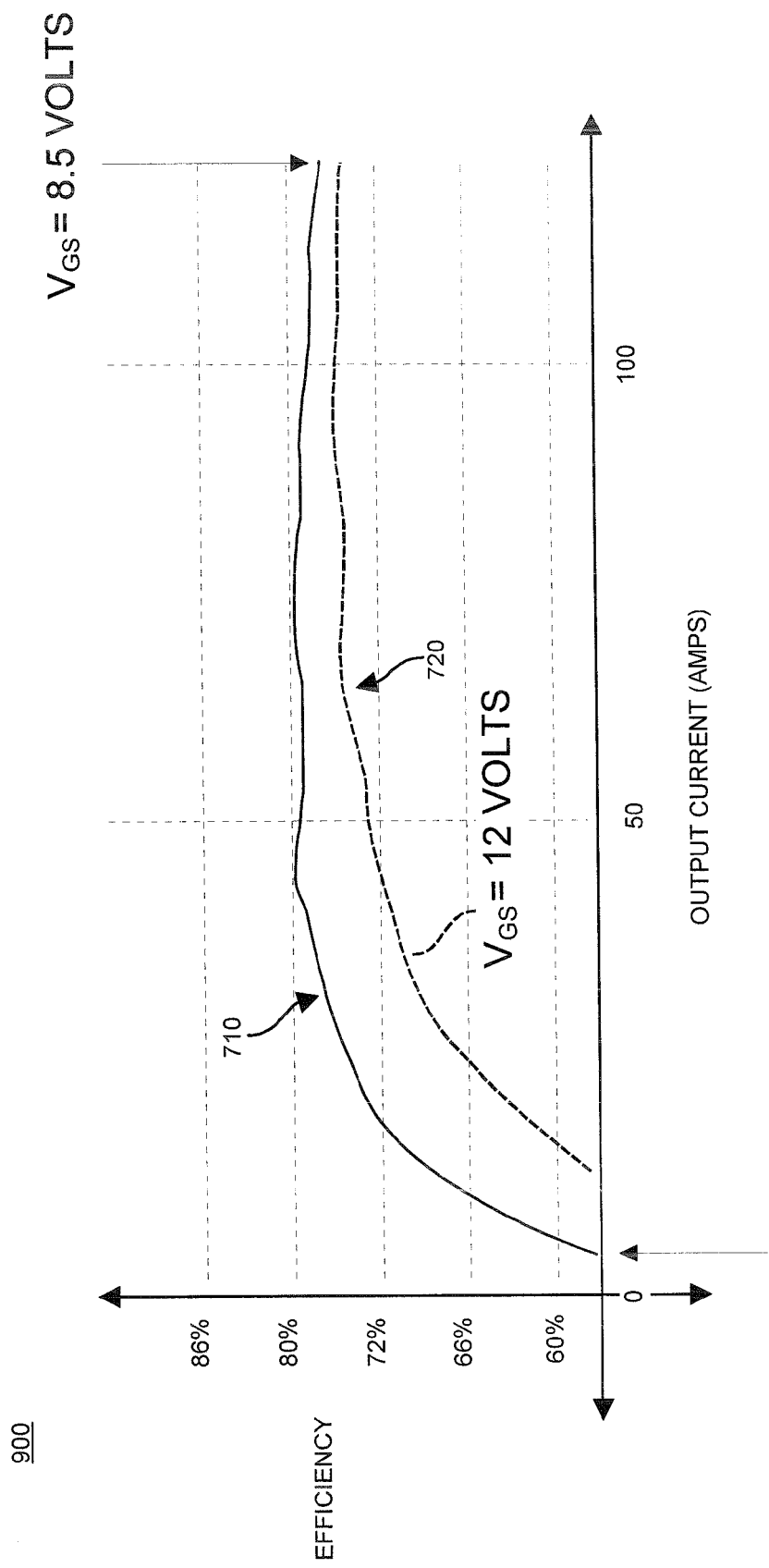
FIG. 9 is an example graph illustrating theoretical power savings by dynamically changing a switch activation voltage level according to embodiments herein.

FIG. 9 is an example graph 700 illustrating theoretical advantages of increasing efficiency based on varying switch bias voltage 152 according to embodiments herein. As shown, line 710 represents efficiency of a power supply based on changing the switch bias voltage 152 depending on a measured power supply parameter such as load current. Line 720 represents efficiency of a respective conventional power supply in which the gate bias voltage is maintained at a constant value over a range of different load values.

The improvement in efficiency can, in part, be seen from comparing the losses associated with driving the gate of the power switch (between ON and OFF states) as compared to the conduction losses (as a result of $R_{DS}$ losses).

The losses associated with driving the gate of the MOSFET are a function of the gate voltage, switching frequency and MOSFET capacitance.

$$P_G = V_{GS}^2 \times C_{ISS} \times F_{sw},$$

where $V_{GS}$ is the voltage applied to turn the gate ON, $C_{ISS}$ is the input capacitance of the field effect transistor, and $F_{SW}$ is the switching frequency of the field effect transistor.

This switching loss $P_G$ will decrease as $V_{GS}$ is decreased. For example, the conduction loss (in the lower MOSFET of the synchronous buck) is given by:

$$P_{COND} = I_{RMS}^2 \times R_{DS}$$

$R_{DS}$ increases as $V_{GS}$ is decreased. If the current were kept constant, the conduction losses would increase. However, according to embodiments herein, the gate activation voltage is reduced when the current through the switch is reduced.

As an example MOSFET, assume that the low side switch of a respective power converter phase is an Infineon BSC020N03LS having a Ciss of 7200 pF, and an $R_{DS}$ which varies from approximately 2.9 mΩ at a $V_{GS}$ of 4.5V to 2.0 mΩ at a $V_{DS}$ of 10V.

In order to compare losses, assume a linear change in $R_{DS}$ as a function of Vgs. Using the two example $R_{DS}$ values from the datasheet you can derive an approximate relationship of:

$$R_{DS} = 3.44 - 0.12 * V_{GS} \text{ mOHMS}$$

It should further be noted that a typical voltage regulator power supply has 12V available for the gate drive and there is no appreciable reduction in $R_{DS}$ for $V_{GS}$ from 10V to 12.

For the example calculation we assume a switching frequency of 400 kHz. Using the parameters listed, and assuming an RMS switch current of 9.6 A (which corresponds to a per phase output current of 10 A with a D=0.083) the conduction loss at 6V (e.g., $R_{DS}$ is approximately=2.6 milliohms) is 240 mW. The conduction loss decreases to 183 mW at $V_{GS}$=12V (e.g., when $R_{DS}$ is approximately=2.0 milliohms)

due to the reduction in $R_{DS}$. At the same time the losses due to the MOSFET input capacitance decrease from 415 mW at 12V to 104 mW at 6V. It can be seen that the overall loss has been reduced by 254 mW.

In a multiphase or interleaved converter, where there are many multiple MOSFETs in the system, this reduction in loss is multiplied by the number of MOSFETs. Thus, the amount of power savings according to embodiments herein can be substantial.

Note that the above calculations indicate power savings with respect to adjusting a gate voltage of the low side switch in a power converter phase. The low side switch may be the dominant source of the conduction losses for low duty cycle converters. In such an embodiment, it is therefore beneficial to vary the drive voltage associated with a low side switch as described herein.

Note that in yet other embodiments, the gate voltage of the high-side switch of the respective power converter phase can be varied as well to save power. However, this will have less power saving effect on a low duty cycle (low output voltage) converter.

In still further embodiments, note that the respective gate voltages of both the high and low side switches can be varied to yield even greater overall power savings as described herein. Varying gate voltages of both high side switches and low side switches may be especially beneficial for converters operating at a higher duty cycle. However, note that varying both the gate voltages at lower duty cycles can yield a beneficial power savings as well.

Figure 10:
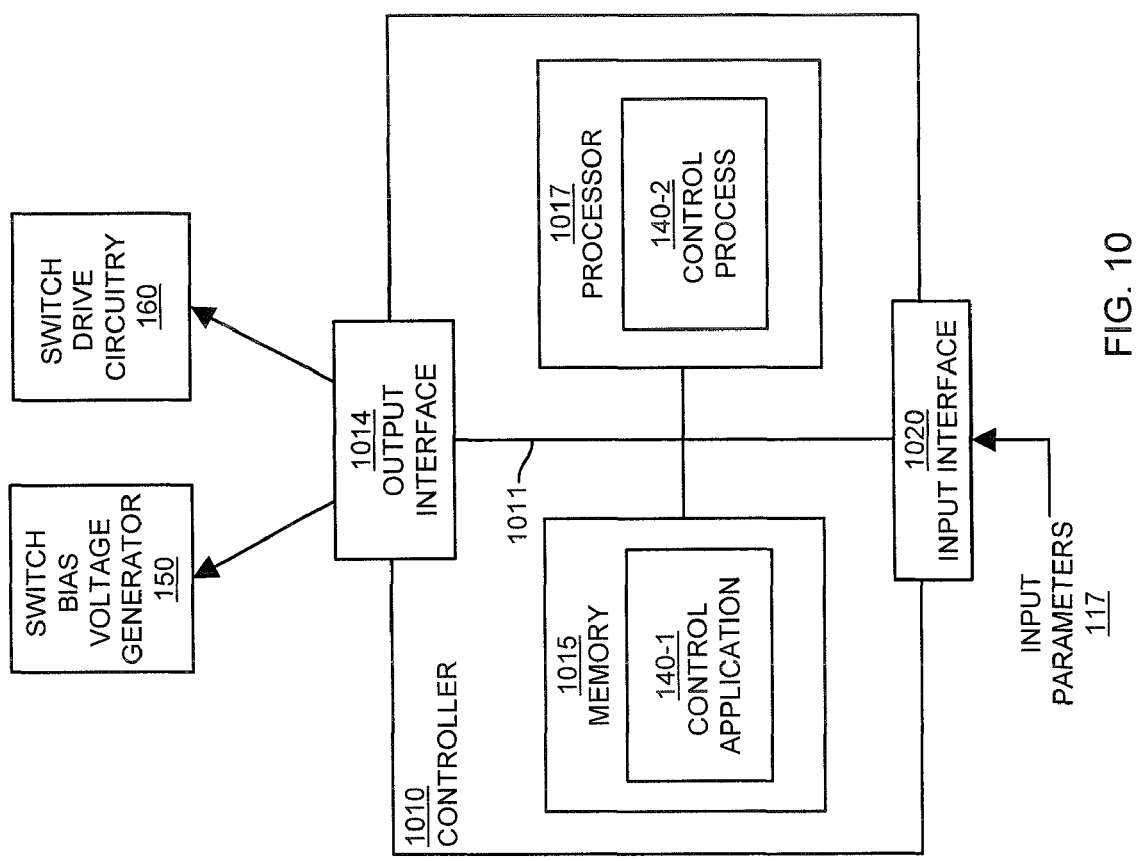
FIG. 10 is an example diagram illustrating an architecture for producing control signal(s) according to embodiments herein.

FIG. 10 is a block diagram of an example architecture of a respective controller system 1010 for implementing control circuit 140 and/or corresponding circuits such as switch bias voltage control circuit 141, output voltage control circuit 142, switch bias voltage generator 150, switch driver circuit 160, monitor circuit 115, etc., according to embodiments herein. Controller 1010 can include a DSP (Digital Signal Processor), FPGA (Field Programmable Gate Array), micro-controller, etc. to carry out the techniques as discussed above and further below.

As shown, controller 1010 of the present example includes an interconnect 1011 that couples a memory system 1015, a processor 1017, output interface 1014, and an input interface 1020.

Memory system 1015 can be encoded with a control application 140-1 that enables processor 1017 to support generation of appropriate control signal(s) 146 and 148 to regulate output voltage 180 via one or more voltage converter phases in switch circuit 110 as discussed above and as discussed further below. Accordingly, control application 140-1 can be embodied as software code such as data and/or logic instructions (e.g., code stored in the memory or on another computer readable medium such as a disk) that supports processing functionality according to different embodiments described herein.

During operation according to one embodiment, processor 1017 accesses memory system 1015 via the use of interconnect 1011 in order to launch, run, execute, interpret or otherwise perform the logic instructions of the control application 140-1. Execution of the control application 140-1 produces processing functionality in control process 140-2. In other words, the control process 140-2 represents one or more portions of the control application 140-1 performing within or upon the processor device 1017.

It should be noted that, in addition to the control process 140-2 that carries out example method operations as discussed herein, other embodiments herein include the control application 140-1 itself such as the un-executed or non-performing logic instructions and/or data for producing control signal(s) to control each of multiple voltage converter phases in switch circuit 110. The control application 140-1 may be stored on a computer readable medium (e.g., a repository) such as a floppy disk, hard disk or in an optical medium. According to other embodiments, the control application 140-1 can also be stored in a memory type system such as in firmware, read only memory (ROM), or, as in this example, as executable code within the memory system 1015 (e.g., within Random Access Memory or RAM).

Functionality supported by control circuit 140 and related circuits in power supply 100 will now be discussed via flowcharts in respective FIGS. 11, 12, and 13. For purposes of the following discussion, the controller circuit 140, control application 140-1, and/or corresponding circuits such as switch bias voltage generator 150, switch driver circuit 160, etc. generally performs steps in the flowchart. Note that there will be some overlap with respect to concepts discussed above. Also, note that the steps in the below flowcharts need not always be executed in the order shown.

Figure 11:
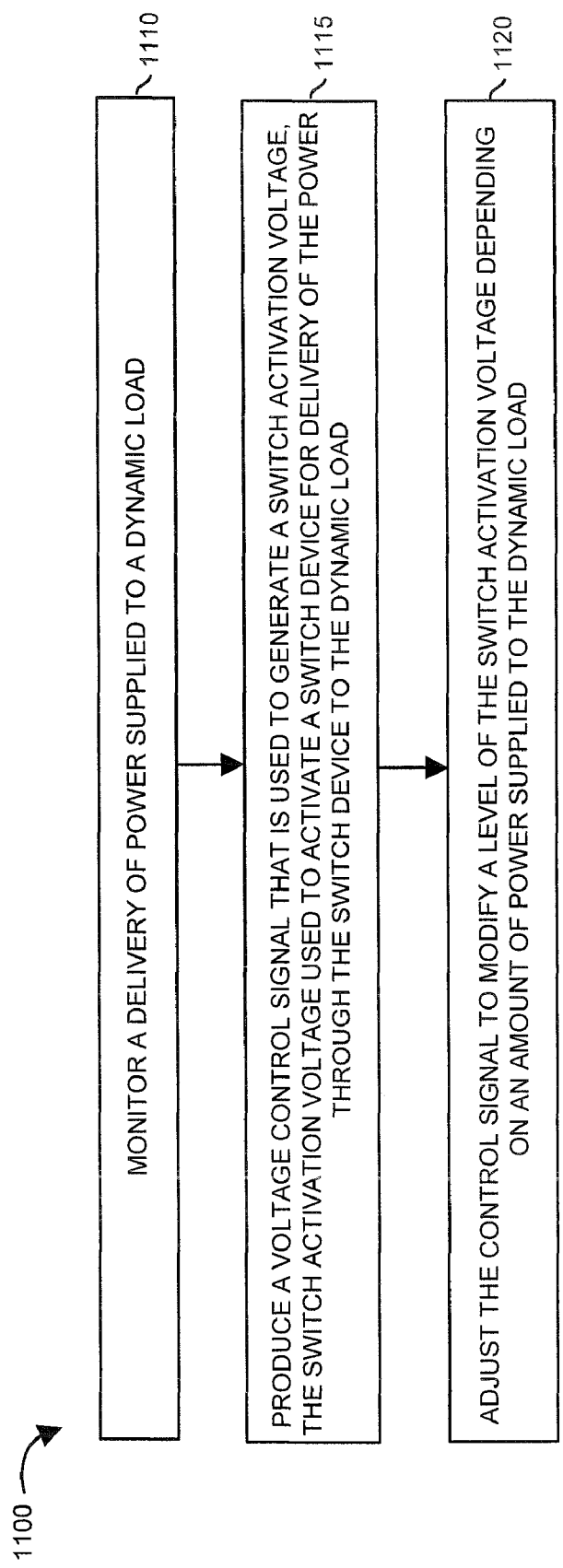
FIGS. 11-13 are example flowcharts illustrating example methods and instructions according to embodiments herein.

More specifically, FIG. 11 is a flowchart 1100 illustrating a technique of varying a switch activation bias voltage according to embodiments herein.

In step 1110, monitor circuit 115 monitors a delivery of a power supply parameter such as power, current, etc. supplied to a dynamic load 118.

In step 1115, control circuit 140 produces a voltage control signal such as bias voltage control signal(s) 146 that is used to generate a switch bias voltage 152. The switch activation voltage is used to activate one or more switch devices in switch circuit 110 for delivery of the power through the switch device to the dynamic load 118.

In step 1120, control circuit 140 adjusts the bias voltage control signal 146 to modify a level of the switch activation voltage such as switch bias voltage 152 depending on an amount of power supplied to the dynamic load 118.

Figure 12:
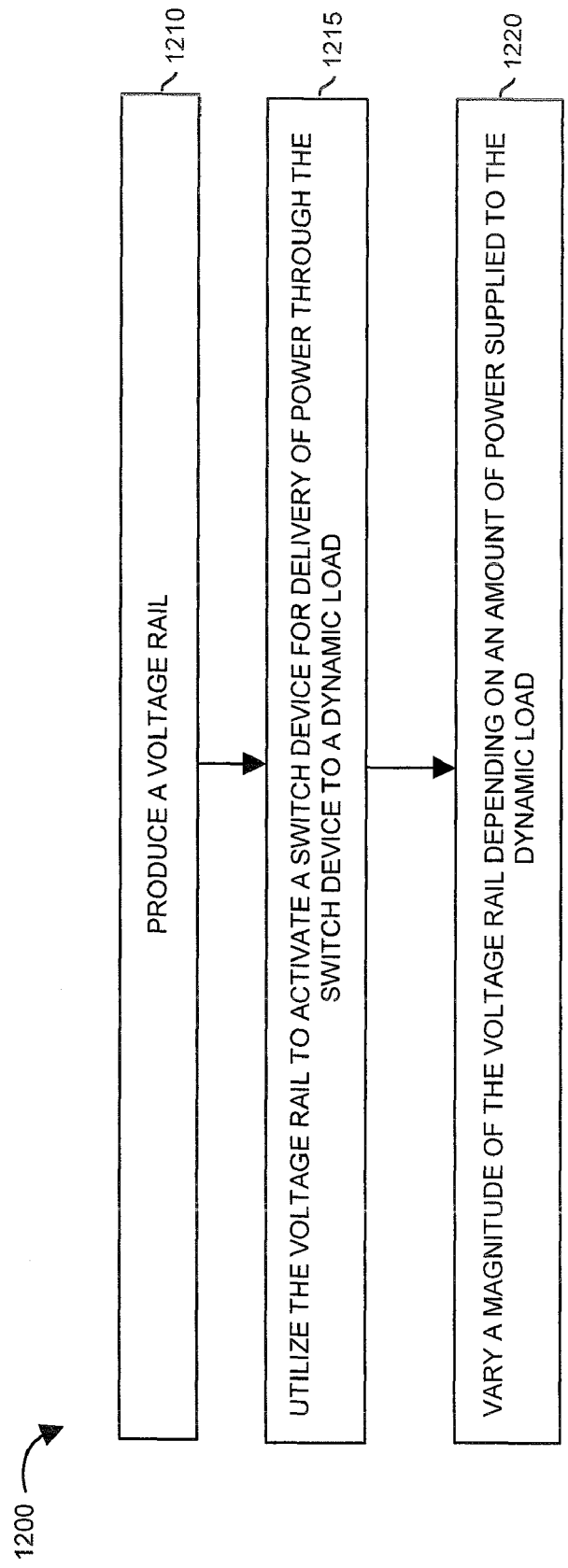

FIG. 12 is a flowchart 1200 illustrating a technique of varying a switch activation switch bias voltage according to embodiments herein.

In step 1210, the switch bias voltage generator 150 produces a voltage rail such as switch bias voltage 152.

In step 1215, the switch driver circuit 160 utilizes the voltage rail such as switch bias voltage 152 to activate a switch device in switch circuit 110 for delivery of power through the switch device to a dynamic load 118.

In step 1220, monitor circuit 115 varies a magnitude or amplitude of the voltage rail such as switch bias voltage 152 depending on an amount of power supplied to the dynamic load 118.

Figure 13:
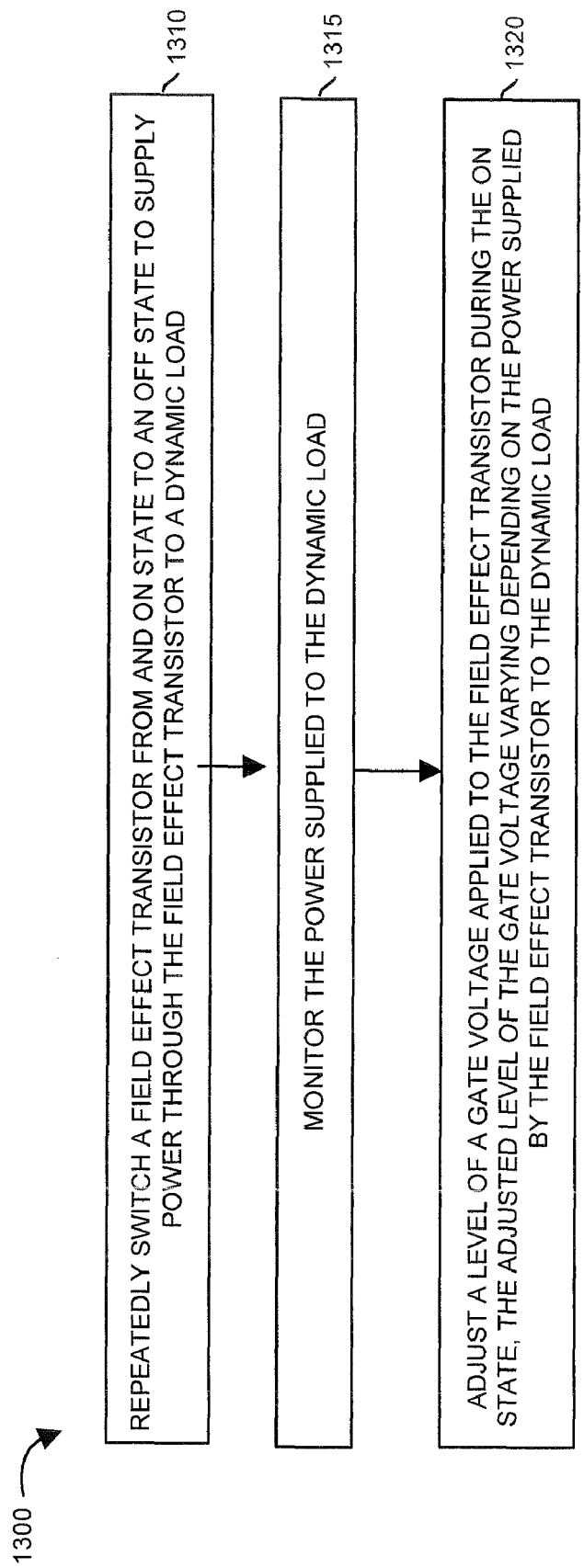

FIG. 13 is a flowchart 1300 illustrating a technique of varying a switch activation switch bias voltage according to embodiments herein.

In step 1310, switch driver circuit 160 repeatedly switches a respective field effect transistor in switch circuit 110 from and on state to an off state to supply power through the field effect transistor to a dynamic load 118.

In step 1315, monitor circuit 115 monitors a parameter such as the power supplied to the dynamic load 118.

In step 1320, the control circuit 140 adjusts a level of a gate voltage such as switch bias voltage 152 applied to the field effect transistor during the on state. As previously discussed, the adjusted level of the gate voltage varies depending on the power supplied by the field effect transistor to the dynamic load Note that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
monitoring a delivery of power supplied to a dynamic load;
producing a voltage control signal that is used to generate a switch activation voltage, the switch activation voltage being a voltage rail used by a driver circuit to activate a switch device to an ON state for delivery of the power through the switch device to the dynamic load; and
adjusting the voltage control signal to modify a magnitude of the switch activation voltage depending on an amount of power supplied to the dynamic load.

2. The method as in claim 1, wherein producing the voltage control signal includes:
generating the voltage control signal to drive a synchronous buck converter that in turn generates the switch activation voltage to activate the switch device.

3. The method as in claim 1, wherein monitoring the delivery of power supplied to the dynamic load includes:
detecting an amount of current delivered to the dynamic load by each of multiple phases in a switching power supply circuit.

4. The method as in claim 1 further comprising:
via the driver circuit, producing a switch control signal to repeatedly activate and deactivate the switch device to deliver the power to the dynamic load;
utilizing the driver circuit to selectively apply the switch activation voltage to the switch device to activate the switch device; and
utilizing the driver circuit to selectively apply a switch deactivation voltage to the switch device to deactivate the switch device, the deactivation voltage received from a voltage source, the voltage source providing a different voltage level than the voltage rail to deactivate the switch device.

5. The method as in claim 4, wherein producing the switch control signal includes:
adjusting a duty cycle of activating and deactivating the switch control signal to maintain a voltage applied to the dynamic load at a substantially fixed level.

6. The method as in claim 1, wherein producing the voltage control signal includes generating the voltage control signal as a feed forward signal to generate the switch activation voltage.

7. The method as in claim 1, wherein the switch device is a field effect transistor; and
wherein adjusting the control signal results in changing the magnitude of the switch activation voltage applied to a respective gate of the field effect transistor to turn the field effect transistor to the ON state.

8. The method as in claim 1 further comprising:
during startup when the switch device initially provides power to the dynamic load, modifying the control signal to reduce an occurrence of transient over-voltages on the switch activation voltage.

9. The method as in claim 1, wherein adjusting the control signal to modify the magnitude of the switch activation voltage includes:
controlling the switch activation voltage in a range between a minimum ON gate voltage value and a maximum ON gate voltage value depending on a magnitude of the power supplied to the dynamic load.

10. The method as in claim 9 further comprising:
controlling the switch activation voltage to be a first ON gate voltage value in the range when the power supplied to the dynamic load is a particular amount; and
controlling the switch activation voltage to be a second ON gate voltage value in the range when the power supplied to the dynamic load is greater than the particular amount, the second ON gate voltage value being greater in magnitude than the first ON gate voltage value.

11. The method as in claim 1 further comprising:
receiving a switch deactivation voltage, the switch deactivation voltage used by the driver circuit to deactivate the switch device subsequent to activating the switch device with the switch activation voltage.

12. The method as in claim 1 further comprising:
varying the magnitude of the voltage rail within a voltage range depending on the amount of power supplied to the dynamic load, each of different magnitudes of the voltage rail within the range being of a suitable magnitude to activate the switch device to the ON state;
utilizing the driver circuit to apply the different magnitudes of the voltage rail over multiple switching cycles, the driver circuit applying the different magnitudes of the voltage rail to the switch device to activate the switch device to the ON state; and
utilizing the driver circuit to apply a switch deactivation voltage to the switch device to deactivate the switch device to an OFF state.

13. The system as in claim 1 further comprising:
setting the switch activation voltage to a first magnitude;
applying, at a first time, the switch activation voltage at the first magnitude to the switch device to activate the switch device to the ON state;
setting the switch activation voltage to a second magnitude, the second magnitude being different than the first magnitude; and
applying, at a second time, the switch activation voltage at the second magnitude to the switch device to activate the switch device to the ON state.

14. The system as in claim 13 further comprising:
setting the switch activation voltage to the second magnitude in response to detecting that the dynamic load consumes an increased amount of current.

15. A system comprising:
a control circuit configured to produce a voltage control signal, the voltage control signal specifying a level of a switch activation voltage;
a switch bias voltage generator configured to generate the switch activation voltage based on the voltage control signal; and
the control circuit configured to adjust the voltage control signal to vary the level of the switch activation voltage generated by the switch bias voltage generator within a voltage range depending on a monitored power supply parameter.

16. A system as in claim 15, wherein the monitored power supply parameter is an amount of current delivered to a dynamic load.

17. The system as in claim 15 further comprising:
a monitor circuit configured to monitor a delivery of power supplied to a dynamic load; and
wherein the control circuit is configured to receive input from the monitor circuit and produce the voltage control signal based on the power supplied to the dynamic load.

18. The system as in claim 17 further comprising:
a switch driver circuit configured to initiate successive application of the switch activation voltage to at least one switch device for delivery of the power through the at least one switch device to the dynamic load; and
wherein the monitor circuit is configured to monitor delivery of current conveyed by the at least one switch device to the load.

19. The system as in claim 18, wherein the switch driver circuit is configured to adjust a duty cycle of the at least one switch device to maintain a voltage applied to the dynamic load at a substantially fixed level.

20. The system as in claim 15, wherein the voltage control signal is a feed forward signal for generating the switch activation voltage.

21. The system as in claim 15, wherein the control circuit is configured to ramp up a duty cycle of the control signal.

22. The system as in claim 15, wherein the control circuit is configured to control the switch activation voltage in a range between a minimum ON gate voltage value and a maximum ON gate voltage value depending on the monitored power supply parameter.

23. The system as in claim 15, wherein application of different amplitudes of the switch activation voltage within the voltage range to a switch device turns the switch device to an ON state to deliver power through the switch device to a load.

24. A system as in claim 15 further comprising:
a drive circuit configured to initiate activation of multiple power converter phases based on sequential application of the switch activation voltage to respective switches in the multiple power converter phases.

25. The system as in claim 24, wherein an output voltage of the multiple power converter phases maintains a dynamic load at a substantially fixed voltage value.

26. A system comprising:
a control circuit configured to produce a voltage control signal;
a switch bias voltage generator configured to generate the switch bias voltage based on the voltage control signal; and
the control circuit configured to adjust the voltage control signal to vary an amplitude of the switch bias voltage within a range depending on a monitored power supply parameter, each of different amplitudes on the switch bias voltage in the range used to activate a switch device to an ON state to control power delivered to a load.

27. A method comprising:
producing a voltage rail;
varying a magnitude of the rail voltage depending on the amount of power supplied to a dynamic load; and
utilizing different magnitudes of the voltage rail to activate a switch device to an ON state for delivery of current through the switch device to power the dynamic load.

28. The method as in claim 27, wherein varying the magnitude of the voltage rail further comprises:
varying the magnitude of the voltage rail within a range of voltage values, each of different voltage values within the range being of a suitable magnitude to activate the switch device to the ON state.

29. A method comprising:
repeatedly switching a field effect transistor from an ON state to an OFF state to supply power through the field effect transistor to a dynamic load;
monitoring the power supplied to the dynamic load; and
adjusting an amplitude of a voltage rail that is used to turn the field effect transistor to the ON state, the adjusted amplitude of the voltage rail used to turn the field effect transistor to the ON state varying depending on the power supplied by the field effect transistor to the dynamic load.

30. The method as in claim 29, wherein adjusting the amplitude of the voltage rail further comprises: varying the amplitude of the voltage rail within a range depending on the power supplied to the dynamic load, the method further comprising:
utilizing different amplitudes of the voltage rail within the range to switch the field effect transistor to the ON state.

* * * * *